United States Patent
Vardis et al.

(10) Patent No.: US 9,221,331 B2
(45) Date of Patent: Dec. 29, 2015

(54) HEADLAMP AND AIR-INDUCTION SYSTEM

(71) Applicants: Nicholas Vardis, Sylvan Lake, MI (US); Marc V Musial, Leonard, MI (US); Mark C. Trostle, Rochester, MI (US); James M Wilder, Farmington Hills, MI (US); Jeffrey C Gale, Rochester, MI (US); Andrew M Reeve, Rochester Hills, MI (US); Joseph S Dehner, Bloomfield Hills, MI (US)

(72) Inventors: Nicholas Vardis, Sylvan Lake, MI (US); Marc V Musial, Leonard, MI (US); Mark C. Trostle, Rochester, MI (US); James M Wilder, Farmington Hills, MI (US); Jeffrey C Gale, Rochester, MI (US); Andrew M Reeve, Rochester Hills, MI (US); Joseph S Dehner, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/267,055

(22) Filed: May 1, 2014

(65) Prior Publication Data

US 2015/0314675 A1 Nov. 5, 2015

(51) Int. Cl.
*B60K 11/08* (2006.01)
*B60K 13/02* (2006.01)
*B60Q 1/00* (2006.01)

(52) U.S. Cl.
CPC .............. *B60K 13/02* (2013.01); *B60Q 1/0017* (2013.01)

(58) Field of Classification Search
CPC ......... B60K 11/00; B60K 11/02; B60K 11/08
USPC .................................................. 180/68.1–68.5
See application file for complete search history.

(56) References Cited

U.S. PATENT DOCUMENTS

| | | | |
|---|---|---|---|
| 2,888,274 A * | 5/1959 | Premo | 280/847 |
| 4,366,530 A | 12/1982 | Milhous | |
| 5,125,714 A * | 6/1992 | Lecher | 296/180.5 |
| 5,901,672 A | 5/1999 | Suzuki et al. | |
| 6,035,955 A | 3/2000 | Suzuki et al. | |
| 6,276,482 B1 | 8/2001 | Moriya et al. | |
| 6,698,539 B2 | 3/2004 | Decuir | |
| 2003/0188902 A1 | 10/2003 | Decuir | |
| 2006/0104074 A1* | 5/2006 | Boniface et al. | 362/496 |
| 2013/0077337 A1 | 3/2013 | Rupar et al. | |

OTHER PUBLICATIONS

International Search Report and Written Opinion dated Aug. 24, 2015 for International Application No. PCT/US2015/025404, International Filing Date Apr. 10, 2015.

* cited by examiner

*Primary Examiner* — John Walters
*Assistant Examiner* — James Triggs
(74) *Attorney, Agent, or Firm* — Ralph E. Smith

(57) ABSTRACT

A vehicle may include an engine, a housing, a lighting assembly and a conduit. The engine propels the vehicle. The housing is mounted to a body of the vehicle and includes an airflow passageway extending through the housing. The lighting assembly is mounted to the housing, defines an air inlet of the airflow passageway and is configured to emit a light pattern in response to receipt of electrical current. The conduit may be connected to the airflow passageway for fluid communication therebetween. The conduit may receive air from the air inlet and may provide the air to the engine for combustion within the engine.

20 Claims, 6 Drawing Sheets

HEADLAMP AND AIR-INDUCTION SYSTEM

FIELD

The present disclosure relates to a headlamp and air-induction system.

BACKGROUND

Vehicles with internal combustion engines include an air-induction system that draws air into the engine. This air mixes with fuel, and the air/fuel mixture is combusted within a cylinder of the engine. Energy from such combustion can drive a piston within the cylinder, which in turn, can drive a driveshaft of the vehicle. The driveshaft can power the wheels of the vehicle.

Vehicle aesthetics and performance are often competing design factors. Often, design compromises are made that detract from a desired look and/or a desired function. Exterior vehicle lighting has become an aesthetic design focus for many modern vehicles. While typical exterior vehicle lighting assemblies perform many functions, those functions do not include engine aspiration. The present disclosure provides an exterior lighting assembly that defines an inlet of an air-induction system in a manner that does not compromise aesthetics or performance.

SUMMARY

The present disclosure provides a vehicle that may include an engine, a housing, a lighting assembly and a conduit. The engine propels the vehicle. The housing may be mounted to a body of the vehicle and includes an airflow passageway extending through the housing. The lighting assembly is mounted to the housing and defines an air inlet of the airflow passageway. The lighting assembly is configured to emit a light pattern in response to receipt of electrical current. The conduit may be connected to the airflow passageway for fluid communication therebetween. The conduit may receive air through the air inlet and provide the air to the engine for combustion within the engine.

In some embodiments, the lighting assembly at least partially surrounds the airflow passageway.

In some embodiments, the air inlet includes a bell shape.

In some embodiments, the airflow passageway includes a funnel shape that increases in diameter as the airflow passageway extends from the air inlet to the conduit.

In some embodiments, the lighting assembly includes a first light-generating unit that at least partially surrounds the air inlet and a second light-generating unit that partially surrounds the air inlet.

In some embodiments, the lighting assembly includes a third light-generating unit that is spaced apart from the air inlet and configured to emit another light pattern in response to receipt of electrical current. The third light-generating unit may include a longitudinal or rotational axis that is spaced apart from a rotational axis of the first and second light-generating units.

In some embodiments, the lighting assembly includes a cap that at least partially formed the bell-shaped air inlet. The first and second light-generating units may emit light through the cap.

In some embodiments, the first light-generating unit includes a daytime running light emitting a first color of light (e.g., white) and the second light-generating unit includes a turn indicator emitting a second color of light (e.g., amber).

In some embodiments, the lighting assembly includes a reflector at least partially surrounding the air inlet. The reflector may be disposed between the first and second light-generating units.

In some embodiments, the first and second light-generating units include at least partially circular shapes.

In some embodiments, the first and second light-generating units include light-emitting diodes.

In some embodiments, the vehicle includes an air cleaner disposed between the engine and the airflow passageway.

In some embodiments, the housing is mounted to a front end of the vehicle.

In some embodiments, the lighting assembly is a part of a headlamp assembly.

In some embodiments, the housing is mounted to a rear end of the vehicle, and the lighting assembly may be a part of a taillight assembly.

In some embodiments, the housing includes a cavity in which the lighting assembly is at least partially received.

In some embodiments, the housing includes a boss extending through the cavity, the boss defining the airflow passageway.

In another form, the present disclosure provides an air-induction system for an internal combustion engine. The air-induction system includes a headlamp assembly and a conduit. The headlamp assembly includes a housing and a lighting assembly. The housing defines an aperture extending therethrough and having an inlet. The lighting assembly is mounted to the headlamp housing and may define the inlet. The lighting assembly is configured to emit a light pattern in response to receipt of electrical current. The conduit may be connected to the aperture for fluid communication therebetween. The conduit provides air received through the inlet to an air cleaner.

In some embodiments, the inlet includes a bell shape.

In some embodiments, the lighting assembly at least partially surrounds the aperture.

In some embodiments, the aperture includes a funnel shape.

In some embodiments, a diameter of the aperture increases as the aperture extends from the inlet to the conduit.

In some embodiments, the lighting assembly includes a first light-generating unit that at least partially surrounds the inlet and a second light-generating unit that at least partially surrounds the inlet.

In some embodiments, the first light-generating unit includes a daytime running light and the second light-generating unit includes a turn indicator.

In some embodiments, the air-induction system includes another lighting assembly mounted to the headlamp housing and configured to emit a second light pattern in response to receipt of electrical current.

In some embodiments, the housing is configured to be mounted to a front end of a vehicle.

In some embodiments, the housing is configured to be mounted to a rear end of the vehicle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
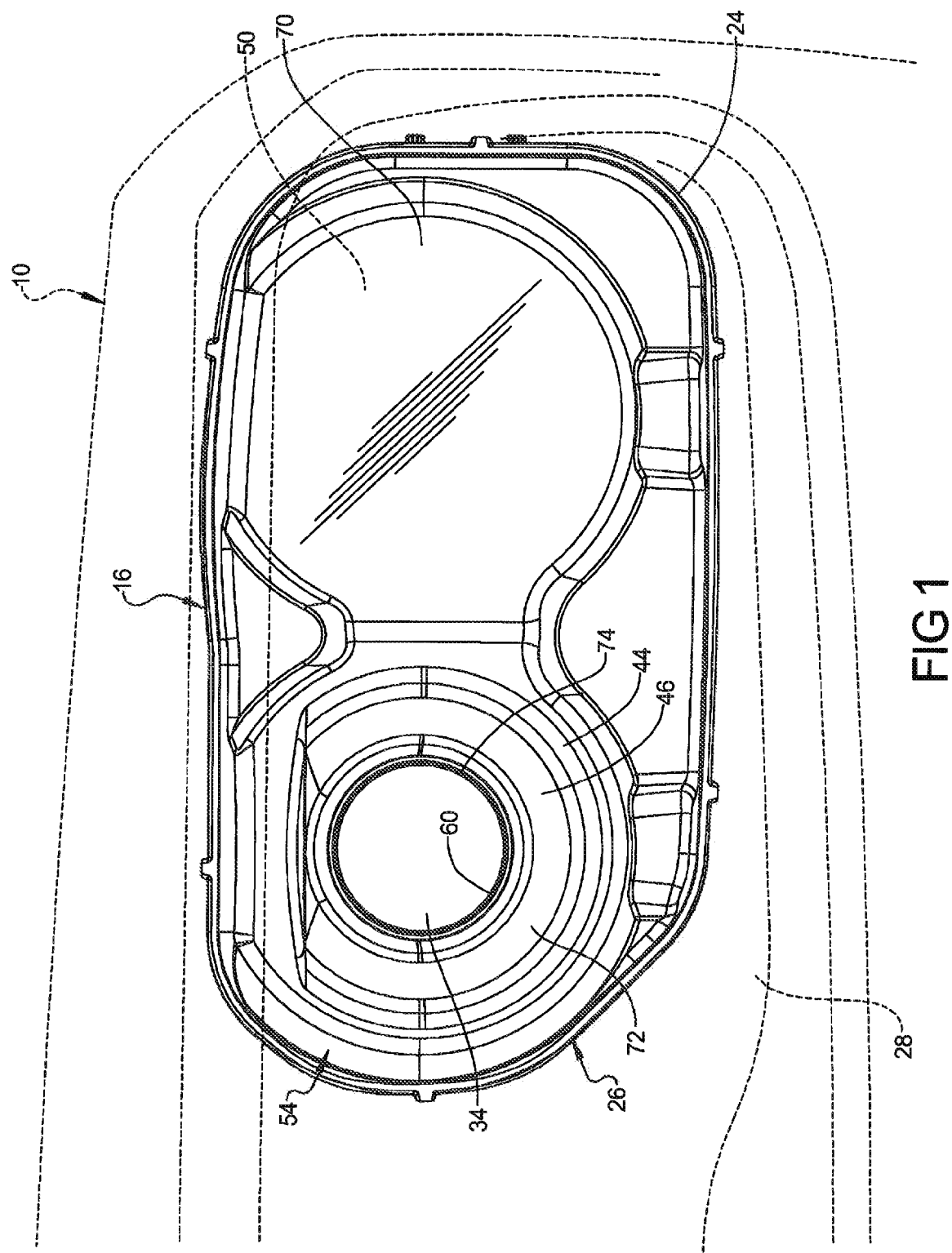
FIG. 1 is a view of a portion of a front end of a vehicle having a headlamp assembly according to the principles of the present disclosure.

In an exemplary embodiment and with reference to FIGS. 1-6, a vehicle 10 is provided that includes an engine 12 and an air-induction system 14 that provides air to the engine 12 for combustion therein. The air-induction system 14 includes a first headlamp assembly 16 and an air cleaner 18. A first conduit 20 extends between the first headlamp assembly 16 and the air cleaner 18. A second conduit 22 extends between the air cleaner 18 and the engine 12. As will be described in more detail below, the first headlamp assembly 16 defines an air inlet of the air-induction system 14. That is, air from the ambient environment enters the air-induction system 14 through the first headlamp assembly 16 and flows from the first headlamp assembly 16 to the air cleaner 18 through the first conduit 20. The air cleaner 18 may include an air filter (not shown) that removes dirt and other particles from the air. From the air cleaner 18, the air flows through the second conduit 22 to the engine 12.

Figure 4:
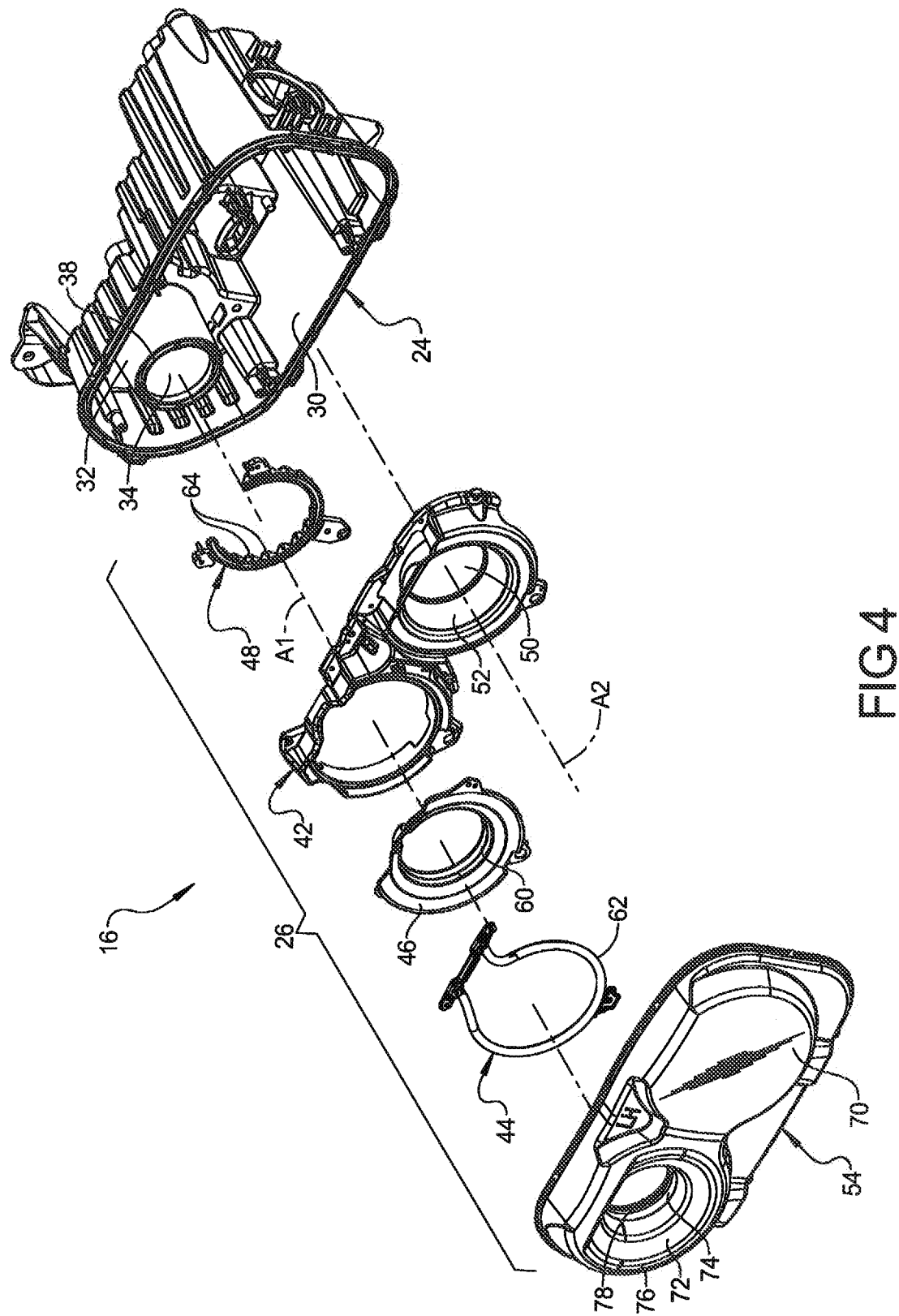
FIG. 4 is a partially exploded perspective view of the headlamp assembly.
Figure 5:
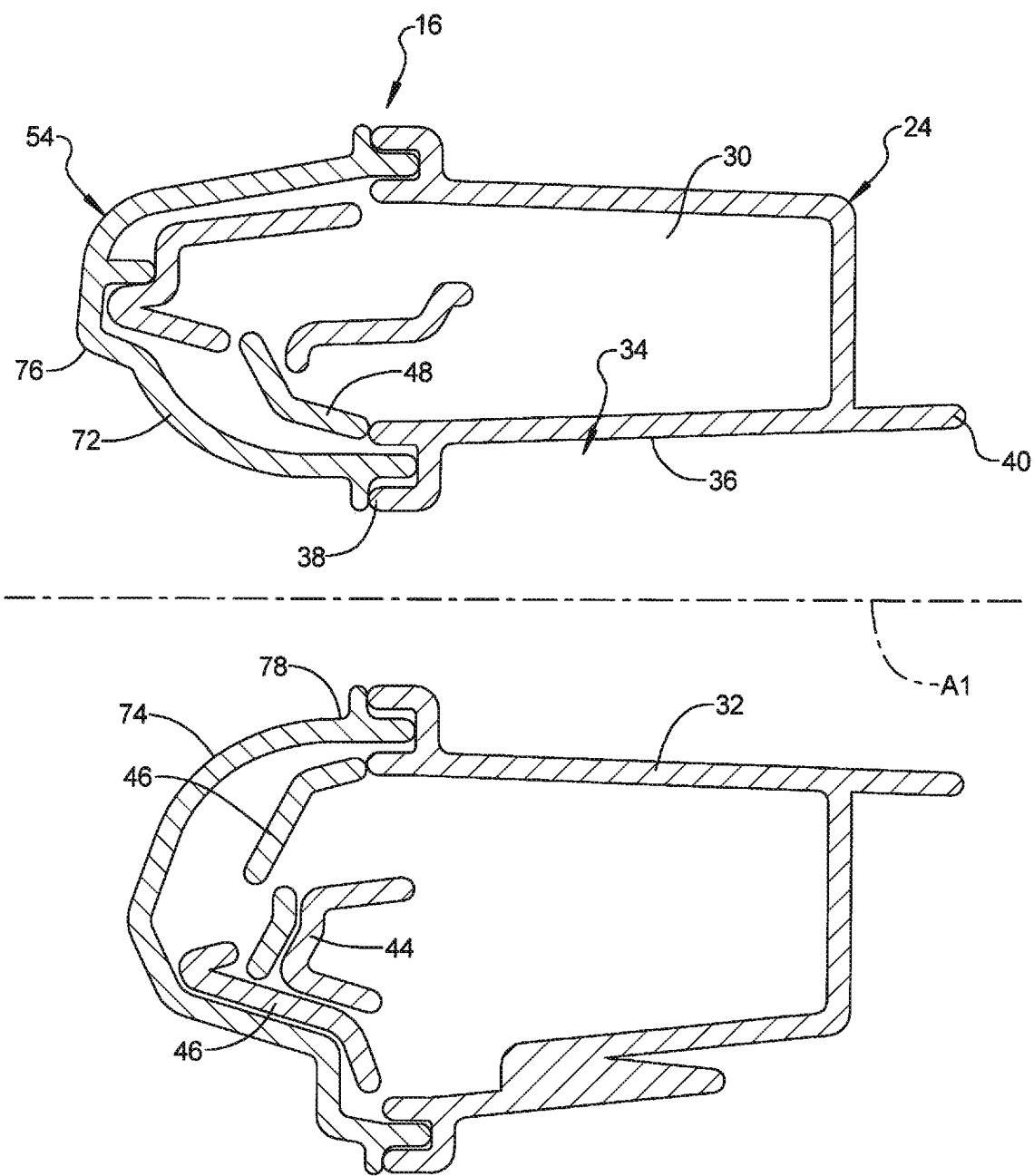
FIG. 5 is a schematic cross-sectional view of the headlamp assembly.
Figure 6:
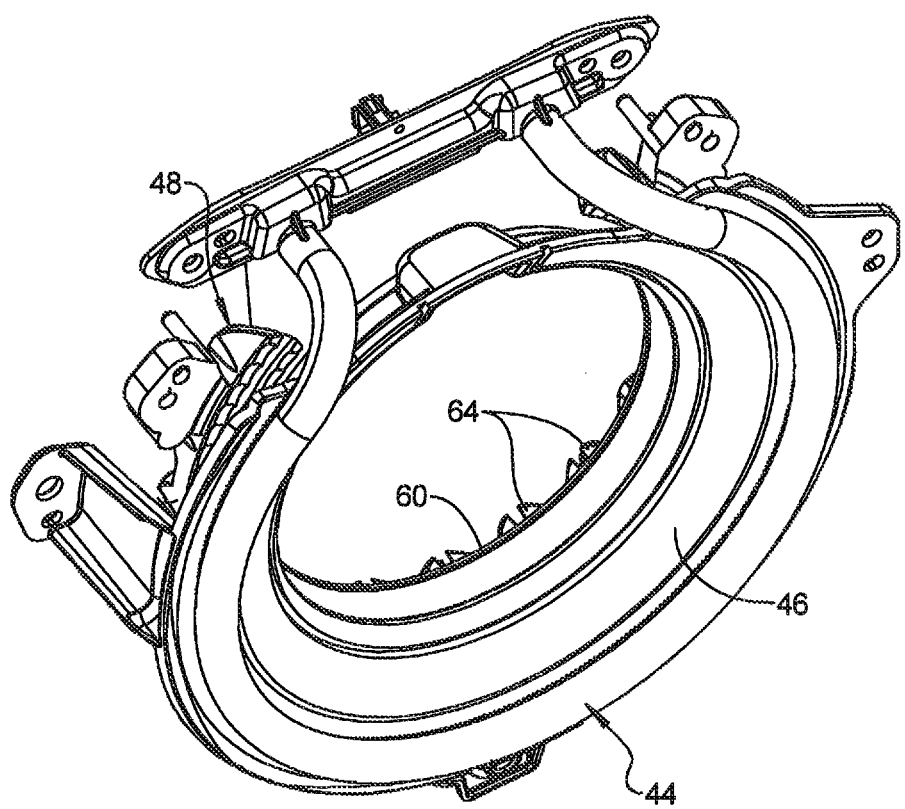
FIG. 6 is a perspective view of an LED tube, reflector and turn indicator of the headlamp assembly.

The first headlamp assembly 16 includes a housing 24 and a lighting assembly 26 at least partially received in the housing 24. The housing 24 may be mounted to and at least partially received in a front end 28 (FIG. 1) of the vehicle 10. As shown in FIGS. 4 and 5, the housing 24 may include a cavity 30 and a generally conical boss 32 disposed within the cavity 30. The boss 32 includes an airflow passageway 34 extending therethrough. As shown in FIG. 4, the airflow passageway 34 may include a generally conical shape having a first axis of rotational symmetry A1 and an inner diametrical surface 36 that increases in diameter as the airflow passageway 34 extends from its forward axial end 38 toward its rearward axial end 40. The first conduit 20 is fluidly coupled to the rearward axial end 40.

The lighting assembly 26 may include a frame 42, a first light-generating unit 44, a first reflector 46, a second light-generating unit 48, a third light-generating unit 50, a second reflector 52, and a cap 54. The frame 42 may be attached to the housing 24 and may include first and second openings 56, 58 extending therethrough. The first opening 56 may extend around the airflow passageway 34 and may include an axis of rotational symmetry that is collinear with the first axis A1. The second opening 58 of the frame 42 may receive the second reflector 52 and the third light-generating unit 50. The second reflector 52 and the third light-generating unit 50 may include a rotational axis A2 that may be spaced apart from and extend parallel to the first axis A1.

The first reflector 46 may be mounted to the frame 42 at the first opening 56 and may include an opening 60 extending therethrough that is generally aligned with or concentric with the airflow passageway 34. The first reflector 46 may be generally bell shaped or funnel shaped, for example. The first and second light-generating units 44, 48 may be attached to the first reflector 46 and/or the frame 42. The first and second light-generating units 44, 48 may extend partially or completely around the opening 60 and the airflow passageway 34. The first light-generating unit 44 may be a signature light or a daytime running light, for example, and may include a light tube 62 and one or more light-emitting diodes (LEDs) transmitting light through the light tube 62. The second light-generating unit 48 may be a turn indicator and may include one or more additional LEDs 64. The third light-generating unit 50 can be a headlamp including an incandescent, halogen or HID (high-intensity discharge) bulb, for example, or any other suitable headlamp bulb.

The cap 54 may sealingly engage the housing 24 and may enclose the lighting assembly 26 within the cavity 30 of the housing 24. The cap 54 may include a first transparent or translucent portion 70 and a second transparent or translucent portion 72. The first transparent portion 70 is aligned with the third light-generating unit 50 and the second reflector 52 to protect the third light-generating unit 50 and allow light to be transmitted therethrough.

The second transparent portion 72 is aligned with the first and second light-generating units 44, 48 and protects the first and second light-generating units 44, 48 while allowing light to be transmitted therethrough. The second transparent portion 72 includes a generally bell-shaped air-inlet opening 74 extending therethrough. As shown in FIG. 5, the air-inlet opening 74 includes an upstream end 76 having a first diameter and a downstream end 78 having a second diameter that is smaller than the first diameter. The downstream end 78 may sealingly engage the forward axial end 38 of the airflow passageway 34. In this manner, the air-inlet opening 74 and the airflow passageway 34 cooperate to form a continuous passageway that extends entirely through the sealed first headlamp assembly 16 (i.e., through the cap 54, the first light-generating unit 44, the first reflector 46, the second light-generating unit 48, the frame 42 and the housing 24).

The bell shape of the air-inlet opening 74 and the funnel shape of the airflow passageway 34 may improve air flow into the air cleaner 18 and engine 12 by reducing or minimizing flow losses therethrough. This improved air flow to the air cleaner 18 and engine 12 improves engine performance. Furthermore, the positioning of the air-inlet opening 74 in the first headlamp assembly 16 at the front end 28 of the vehicle 10 provides the additional benefit of being at a high air-pressure zone of the vehicle 10 while the vehicle 10 is moving forward. This causes a ram-air effect that forces a larger volume of air over a given time period through the air-induction system 14 and into the engine 12, which further improves engine performance. Because the air-inlet opening 74 extends through the first and second light-generating units 44, 48 and the first reflector 46, the aesthetic design of these components need not be altered to provide an inlet for the air-induction system 14. The bell or funnel shape of the first reflector 46 is also beneficial for functionality of the lighting assembly 26, as this shape facilitates the reflection and transmission of light out of the first headlamp assembly 16. Furthermore, the sealing engagement between the cap 54 and the housing 24 seals off the cavity 30 from the air-inlet opening 74 and the airflow passageway 34.

Figure 2:
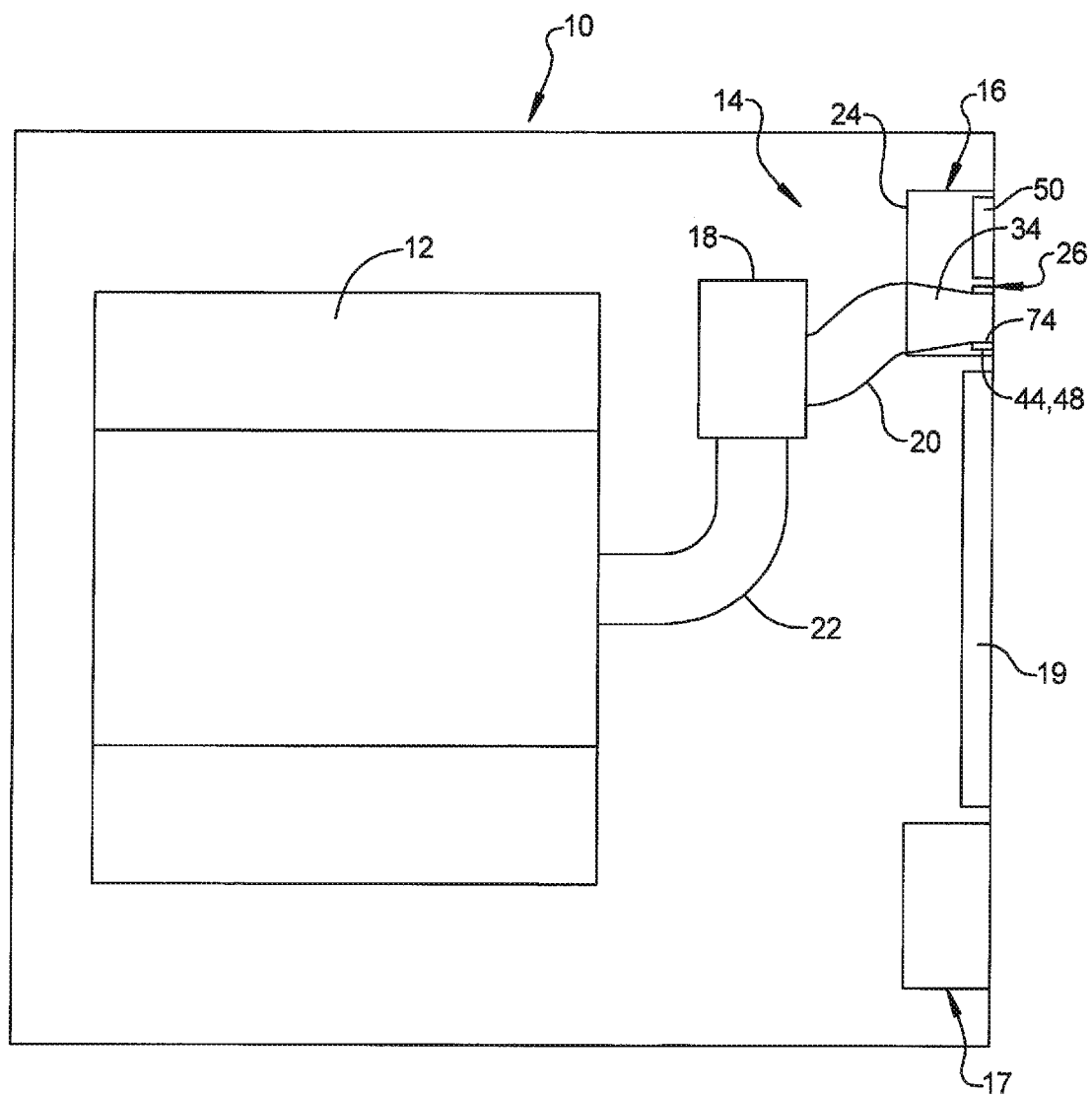
FIG. 2 is a schematic representation of the vehicle having the headlamp assembly and an air-induction system according to the principles of the present disclosure.
Figure 3:
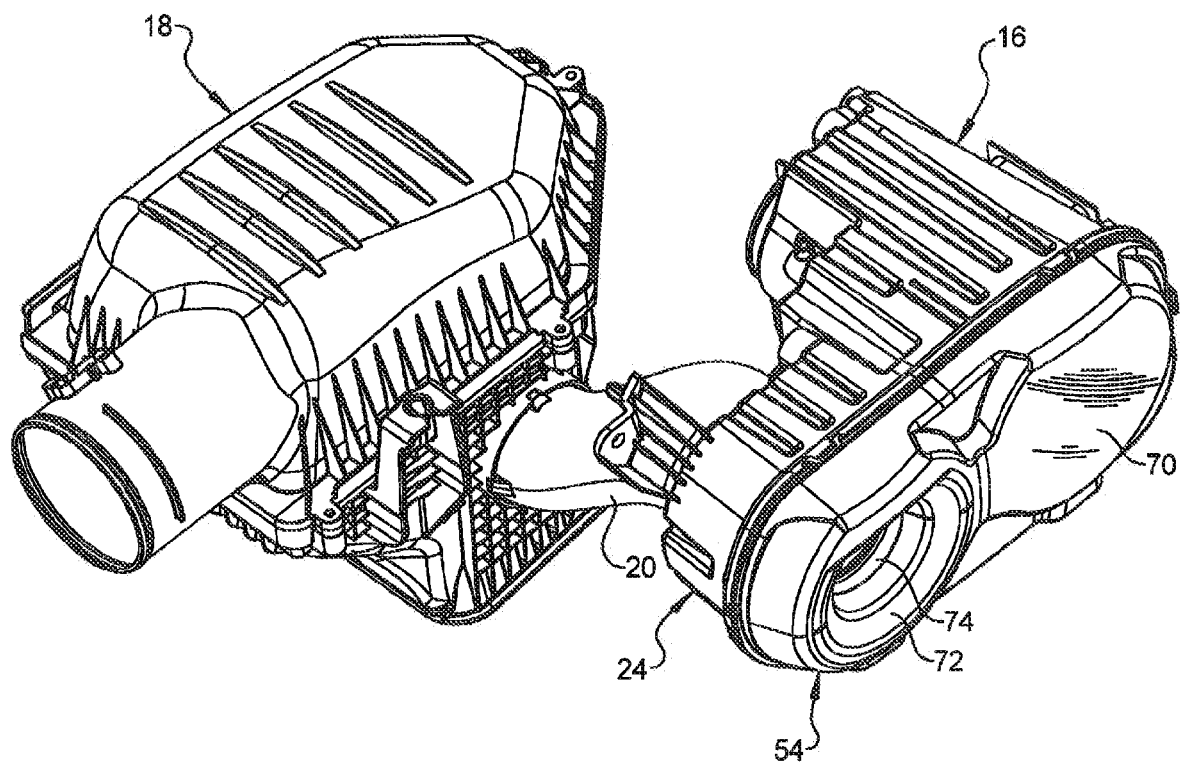
FIG. 3 is a perspective view of the headlamp assembly and air cleaner assembly.

As shown schematically in FIG. 2, the vehicle 10 may include a second headlamp assembly 17 and a grille 19 disposed between the first and second headlamp assemblies 16, 17. In some embodiments, the structure and function of the second headlamp assembly 17 may be similar or identical to the first headlamp assembly 16. That is, the second headlamp assembly 17 may form another air inlet of the air-induction system 14. In other embodiments, the structure of the second headlamp assembly 17 may be generally similar to that of the first headlamp assembly 16, except the second headlamp assembly 17 might not include an air inlet passage and might not be associated with the air-induction system 14. In still other embodiments, the second headlamp assembly 17 could include an air inlet passage that is not connected to the air-induction system 14. Such an air inlet passage may provide air to cool certain vehicle components, for example.

It will be appreciated that the air-inlet opening 74 could be shaped differently from the bell shape shown in the figures. For example, the air-inlet opening 74 could be cylindrical or funnel-shaped. Furthermore, while the air-induction system 14 is described above as including the first headlamp assembly 16, it will be appreciated that a taillight assembly, fog light assembly or other light assembly could include an air-inlet opening and airflow passageway for providing air to an engine or other vehicle component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
    an engine for propelling the vehicle;
    a housing mounted to a body of the vehicle and including an airflow passageway extending through the housing;
    a lighting assembly mounted to the housing and defining an air inlet of the airflow passageway and configured to emit a light pattern in response to receipt of electrical current, the lighting assembly including a first light-generating unit that at least partially surrounds the air inlet such that the light pattern at least partially surrounds the air inlet; and
    a conduit connected to the airflow passageway for fluid communication therebetween, the conduit receiving air from the air inlet and providing the air to the engine for combustion within the engine.

2. The vehicle of claim 1, wherein the lighting assembly at least partially surrounds the airflow passageway.

3. The vehicle of claim 2, wherein the air inlet includes a bell shape.

4. A vehicle comprising:
    an engine for propelling the vehicle;
    a housing mounted to a body of the vehicle and including an airflow passageway extending through the housing;
    a lighting assembly mounted to the housing and defining an air inlet of the airflow passageway and configured to emit a light pattern in response to receipt of electrical current; and
    a conduit connected to the airflow passageway for fluid communication therebetween, the conduit receiving air from the air inlet and providing the air to the engine for combustion within the engine,
    wherein the lighting assembly at least partially surrounds the airflow passageway,
    wherein the air inlet includes a bell shape, and
    wherein the airflow passageway includes a funnel shape that increases in diameter as the airflow passageway extends from the air inlet to the conduit.

5. The vehicle of claim 1, wherein the lighting assembly includes a cap at least partially forming the air inlet and the first light-generating unit is configured to emit light through the cap.

6. The vehicle of claim 5, wherein the lighting assembly includes a second light-generating unit that at least partially surrounds the air inlet.

7. The vehicle of claim 6, wherein the lighting assembly includes a third light-generating unit spaced apart from the air inlet and configured to emit another light pattern in response to receipt of electrical current, the third light-generating unit including an axis that is spaced apart from a rotational axis of the first and second light-generating units.

8. The vehicle of claim 6, wherein the first light-generating unit includes a daytime running light emitting a first color of light and the second light-generating unit includes a turn indicator emitting a second color of light.

9. The vehicle of claim 8, wherein the lighting assembly includes a reflector at least partially surrounding the air inlet.

10. The vehicle of claim 8, wherein the first and second light-generating units include at least partially circular shapes.

11. The vehicle of claim 1, further comprising an air cleaner disposed between the engine and the airflow passageway.

12. An air-induction system for an internal combustion engine, the air-induction system comprising:
    a lamp assembly including a housing and a lighting assembly, the housing defining an aperture extending therethrough and having an inlet, the lighting assembly mounted to the housing and defining the inlet and configured to emit a light pattern in response to receipt of electrical current, the lighting assembly including a first light-generating unit that at least partially surrounds the inlet such that the light pattern at least partially surrounds the inlet; and
    a conduit connected to the aperture for fluid communication therebetween and providing air received through the inlet to an air cleaner.

13. The air-induction system of claim 12, wherein the inlet includes a bell shape.

14. The air-induction system of claim 12, wherein the aperture includes a funnel shape.

15. The air-induction system of claim 14, wherein a diameter of the aperture increases as the aperture extends from the inlet to the conduit.

16. The air-induction system of claim 15, wherein the lighting assembly includes a cap at least partially forming the inlet and the first light-generating unit is configured to emit light through the cap.

17. The air-induction system of claim 16, wherein the lighting assembly includes a second light-generating unit that partially surrounds the inlet.

18. The air-induction system of claim 17, wherein the first light-generating unit includes a daytime running light and the second light-generating unit includes a turn indicator.

19. The air-induction system of claim 12, wherein the housing is configured to be mounted to a front end of a vehicle or to a rear end of a vehicle.

20. The vehicle of claim 4, wherein the lighting assembly includes a light-generating unit that at least partially surrounds the air inlet such that the light pattern at least partially surrounds the air inlet.

* * * * *